3,086,980
3-ENOL ETHERS OF PREGNENE COMPOUNDS

Howard J. Ringold, Shrewsbury, Mass., and John Edwards, Mexico City, Mexico, assignors, by mesne assignments, to Syntex Corporation, a corporation of Panama
No Drawing. Filed Sept. 18, 1961, Ser. No. 138,621
20 Claims. (Cl. 260—397.45)

The present invention relates to novel cyclopentanophenanthrene derivatives.

More particularly, it relates to the novel 3-enol-ethers of a $\Delta^4$-pregnen-17$\alpha$,21-diol-3,20-dione oxygenated at C–11 and halogenated at C–6 and/or at C–6 and C–9, to the corresponding 16$\alpha$- and 16$\beta$-methyl derivatives thereof, as well as to their 21-esters. The following formulas illustrate the staring compounds (I) and the new compounds (II) object of the present invention:

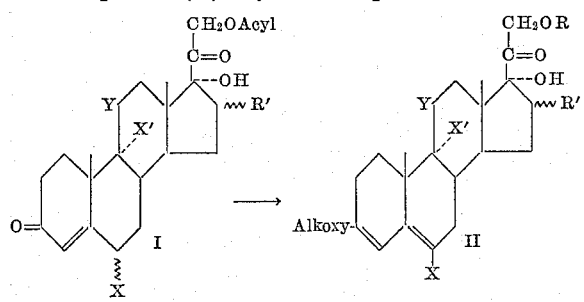

In the above equation X represents fluoro, chloro, or bromo; X' represents hydrogen, chloro or fluoro; Y represents $\beta$-OH, $\beta$-O—CO—CF$_3$, or =O; acyl represents a conventional acyl group i.e. of a hydrocarbon carboxylic acid of up to 12 carbon atoms; R represents either hydrogen or the same acyl group, and R' represents hydrogen, $\alpha$-methyl or $\beta$-methyl.

The alkoxy group at C–2 comprises any ether group whose hydrocarbon residue is that of any hydrocarbon up to 12 carbon atoms, saturated or unsaturated, of straight or branched chain, cyclic or of a chain combining these configurations, substituted or not with functional groups, and whose group may be an alkyl, aryl or alkylaryl group. Such group can be, for example, the methyl, ethyl, propyl, butyl, isopropyl, hydroxyethyl, acetoxyethyl, phenyl, benzyl, p-methoxyphenyl, $\beta$-chloropropyl or cyclopentylpropyl group.

The new enol-ethers (II) exhibit very valuable therapeutic properties, such as anti-inflammatory, glycogenic, thymolytic, catabolic, anti-estrogenic and anti-androgenic effects.

A well known, and generally accepted, method for testing an activity of the cortical type hormones is the determination of the thymolytic effect, which test indicates the anti-arthritic activity in hormones. In the following table we compare by way of example, the thymolytic effect of hydrocortisone 21-acetate with that of the 3-ethyl-enol-ether of 6-chloro-cortisone 21-acetate in adrenalectomized rats, when such compounds were administered by the oral route.

| Compound | Dose (mg.) | Number of animals | Relative weight of the thymus |
|---|---|---|---|
| Hydrocortisone 21-acetate | 0 | 13 | 4.0 |
|  | 1.0 | 14 | 2.77 |
|  | 2.0 | 15 | 2.34 |
|  | 4.0 | 15 | 1.83 |
|  | 8.0 | 14 | 1.81 |
| Ethyl-enol-ether of 6-chloro-cortisone 21-acetate | 0.2 | 8 | 2.30 |
|  | 0.4 | 15 | 1.40 |
|  | 0.8 | 15 | 0.81 |
|  | 1.6 | 15 | 0.58 |
|  | 3.2 | 15 | 0.38 |

From this table it is evident that the thymolytic effect of the ethyl-enol-ether of 6-chloro-cortisone 21-acetate is ten times greater than that of hydrocortisone 21-acetate.

For preparing the novel enol-ethers we treated (I) with a triester of orthoformic acid in mixture with dioxane and in the presence of p-toluenesulfonic acid, to produce the desired enol-ether (II). The ester group at C–21 of (I) may be any ester group, but generally we started from a 21-acetate; in a 6-monohalo-hydrocortisone compound we further protected the 11$\beta$-hydroxyl group by esterification with trifluoroacetic acid.

Thus, from the 11-trifluoroacetate-21-acylate of a 6-halo-hydrocortisone (I; X=F, Cl or Br; X'=H; Y=$\beta$-O—CO—CF$_3$; R'=H), we obtained the respective 11-trifluoroacetate-21-acylate of the corresponding 6-halo-3-alkoxy-$\Delta^{3,5}$-pregnadien-11$\beta$,17$\alpha$,21-triol-20-one (II; X=F, Cl or Br; X'=H; Y=$\beta$-O—CO—CF$_3$; R=acyl; R'=H); from a 21-ester of a 6,9$\alpha$-dihalo-hydrocortisone (I; X=F, Cl or Br; X'=F or Cl; Y=$\beta$-OH; R'=H); we obtained the corresponding 21-ester of the respective 6,9$\alpha$-dihalo-3-alkoxy-$\Delta^{3,5}$-pregnadien - 11$\beta$,17$\alpha$,21 - triol-20-one (II; X=F, Cl or Br; X'=F or Cl; Y=$\beta$-OH; R=acyl; R'=H) from an 11-trifluoroacetate-21-acylate of a 6-halo-16-methyl hydrocortisone (I; X=F, Cl or Br; X'=H; Y=$\beta$-O—CO—CF$_3$; R'=methyl); we obtained the respective 11-trifluoroacetate-21-acetate of the corresponding 16-methyl-6-halo-3-alkoxy-$\Delta^{3,5}$-pregnadien-11$\beta$, 17$\alpha$,21-triol-20-one (II; X=F, Cl or Br; X'=H; Y=$\beta$-O—CO—CF$_3$; R=acyl; R'=methyl); a 21-ester of a 6-halo-cortisone or their corresponding 16$\alpha$- or 16$\beta$-methyl analogs (I; X=F, Cl or Br; X'=H; Y=O; R=acyl; R'=H, $\alpha$- or $\beta$-methyl) furnished the corresponding 21-ester of the respective 6-halo-3-alkoxy-$\Delta^{3,5}$-pregnadien-17$\alpha$,21-diol-11,20-dione (II; X=F, Cl or Br; X'=H; Y=O=; R=acyl; R'=H, $\alpha$- or $\beta$-methyl). A 21-ester of 6,9-dihalo-cortisone or their 16$\alpha$- or $\beta$-methyl analogs, (I; X=F, Cl or Br; X'=F or Cl; Y=O=; R=H, $\alpha$- or $\beta$-methyl) was converted into the corresponding 21-ester of the respective 6,9-dihalo-3-alkoxy-$\Delta^{3,5}$-pregnadien-17$\alpha$,21-diol-11,20-dione (II; X=F, Cl or Br; X'=F or Cl; Y=O=; R=acyl; R=H, $\alpha$- or $\beta$-methyl).

The ester group at C–21 or the ester groups at C–11 and C–21 of the compounds of Formula II mentioned above were hydrolyzed to produce the corresponding free alcohols and then the hydroxyl group at C–21 was reesterified; for these reactions we employed conventional methods; for example, the hydrolysis was effected with dilute methanolic potassium hydroxide and the reesterification at C–21 was carried out by treatment with the anhydride of a hydrocarbon carboxylic acid of up to 12 carbon atoms, in pyridine solution. The anhydride was derived from an acid which may be saturated or unsaturated, of straight or branched chain, cyclic or mixed cyclic-aliphatic, substituted or not with methoxy, halogen or other groups, to produce, among other 21-esters, the acetates, propionates, butyrates, hemisuccinates, caproates, benzoates, trimethylacetates, phenoxyacetates, phenylpropionates, cyclopentylpropionates and $\beta$-chloropropionates of the compounds of Formula II.

The following preparations illustrate the production of certain of the starting compounds.

PREPARATION 1

A solution of 2 g. of 6$\alpha$-chloro-hydrocortisone 21-acetate in 12 cc. of anhydrous dioxane was treated with 4.5 cc. of trifluoroacetic anhydride and the mixture was stirred at room temperature for 18 hours and then poured into a mixture of ice and water; the product was extracted with 4 portions of methylene chloride and the combined extract was washed with water to neutral, dried over anhydrous sodium sulfate and evaporated to dryness. The residue crystallized upon trituration with ether. By chromatography on washed alumina there was obtained the pure 6α-chloro-hydrocortisone 11-trifluoroacetate-21-acetate.

PREPARATION 2

In other experiments we applied the method of the previous preparation to any other 21-acylate of the known 6-halo (fluoro, chloro or bromo)-hydrocortisone and to 21-acylates of 16α- or β-methyl-hydrocortisone derivatives, to produce the respective 11-trifluoroacetates-21-acylates. (6-chloro-cortisone and hydrocortisone compounds are disclosed in U.S. applications Serial Nos. 670,366 and 670,368, filed July 8, 1957; 6-fluoro derivatives of cortisone and hydrocortisone in U.S. patent application Serial No. 740,550, filed June 9, 1958, now Patent No. 2,934,546; 6-chloro-9α-halo derivatives of cortisone and hydrocortisone in U.S. patent application Serial No. 741,753, filed June 13, 1958; 6-fluoro-9α-halo derivatives of cortisone and hydrocortisone in U.S. patent application Serial No. 749,652, filed July 21, 1958, now Patent No. 2,951,840; 6-chloro-16α-methyl hydrocortisone and cortisone as well as the corresponding 9α-halo derivatives have been disclosed in U.S. patent application Serial No. 825,665, filed July 8, 1959, 6-chloro-16β-methyl hydrocortisone and cortisone, and the corresponding 9α-halo derivatives in U.S. patent application Serial No. 824,200 filed July 1, 1959, now abandoned; 6-fluoro-16α-methyl-hydrocortisone and cortisone and the corresponding 9α-halo derivatives have been described by J. Edwards et al. in J. Am. Chem. Soc. 81, 3156 (1959), and also in our copending application Serial No. 789,242, filed January 27, 1959, and 6-fluoro-16β-methyl-hydrocortisone and cortisone and the corresponding 9α-halo derivatives in our copending application Serial No. 792,962, filed on February 13, 1959; the equivalent 6-bromo compounds may be prepared in the same way as there disclosed.)

The following specific examples serve to illustrate but are not intended to limit the present invention.

Example I

To a solution of 2 g. of 6α-fluoro-hydrocortisone 11-trifluoroacetate-21-acetate in 14 cc. of anhydrous dioxane there was added 2 cc. of ethyl orthoformate and 60 mg. of p-toluenesulfonic acid monohydrate and the mixture was stirred for 30 minutes; 5 cc. of pyridine and 200 cc. of water were then added with stirring and cooling and the product was extracted with ether. The extract was washed with water, dried over anhydrous sodium sulfate and evaporated to dryness. Crystallization of the residue from acetone-hexane afforded 6-fluoro-3-ethoxy-$\Delta^{3,5}$-pregnadiene-11β,17α,21-triol-20-one 11-trifluoroacetate-21-acetate.

1 g. of the above compound was treated with 10 cc. of a methanol solution containing 100 mg. of potassium hydroxide, with stirring at 0° C. for 2 hours. The mixture was acidified with acetic acid, poured into ice water and the precipitate was collected, washed with water, dried under vacuum and recrystallized from methylene chloride. There was thus obtained 6-fluoro-3-ethoxy-$\Delta^{3,5}$-pregnadiene-11β,17α,21-triol-20-one.

A mixture of 500 mg. of the above compound, 5 cc. of pyridine and 0.8 cc. of propionic anhydride was kept overnight at room temperature and then poured into water, heated on the steam bath for half an hour and cooled. The precipitate was filtered, washed with water, dried and recrystallized from acetone-hexane, thus giving 6-fluoro-3-ethoxy-$\Delta^{3,5}$-pregnadiene-11β,17α-21-triol-20-one 21-propionate.

In a similar manner, 6α-fluoro-16β-methyl-hydrocortisone 21-acetate-11-trifluoroacetate gave successively 6-fluoro-16β-methyl-3-ethoxy-$\Delta^{3,5}$-pregnadiene-11β,17α-21-triol-20-one-11-trifluoroacetate 21-acetate, 6-fluoro-16β-methyl-3-ethoxy-$\Delta^{3,5}$-pregnadiene-11β,17α,21-triol-20-one and the 21-propionate.

Example II

By the same method, 6α,9α-difluoro-hydrocortisone 21-acetate was converted into 6,9α-difluoro-3-ethoxy-$\Delta^{3,5}$-pregnadiene-11β,17α-21-triol-20-one 21-acetate; the acetate group of the latter was then hydrolyzed and the resulting 6,9α-difluoro-3-ethoxy-$\Delta^{3,5}$-pregnadiene-11β,17α,21-triol-20-one was reesterified to produce its 21-propionate.

Example III

In the method of Example I, there was substituted for the ethyl orthoformate the tripropyl ester of orthoformic acid. There were thus obtained 6-fluoro-3-propoxy-$\Delta^{3,5}$-pregnadiene-11β,17α,21-triol-20-one 11-trifluoroacetate 21-acetate, 6-fluoro-16β-methyl-3-propoxy-$\Delta^{3,5}$-pregnadiene-11β,17α-21-triol-20-one 11-trifluoroacetate-21-acetate, then the free alcohols and finally their 21-propionates.

Example IV

By following the methods described in the previous examples there were prepared the 3-alkyl-enol-ethers of all of the 6-halo and 6,9α-dihalo analogs of hydrocortisone and cortisone comprised in our invention, either in the free form or correspondingly esterified. For example, there were prepared: 6-chloro-3-ethoxy-$\Delta^{3,5}$-pregnadiene-11β,17α,21-triol-20-one 11-trifluoroacetate-21-butyrate then the free 6-chloro-3-ethoxy-$\Delta^{3,5}$-pregnadiene-11β, 17α,21-triol-20-one, and then the latter was esterified at C-21 by reaction with cyclopentylpropionic acid anhydride, thus giving 6-chloro-3-ethoxy-$\Delta^{3,5}$-pregnadiene-11β, 17α,21-triol-20-one 21-cyclopentylpropionate. In another experiment there was formed the 3-propyl-enol-ether starting from 6α-bromo-9α-chloro-hydrocortisone 21-acetate, and upon subsequent hydrolysis of the acetate group there was obtained 6-bromo-9α-chloro-3-propoxy-$\Delta^{3,5}$-pregnadiene-11β,17α,21-triol-20-one which was then converted into its 21-butyrate by reaction with butyric anhydride; by the same method 6α,9α-difluoro-cortisone 21-acetate was converted into 6,9α-difluoro-3-ethoxy-$\Delta^{3,5}$-pregnadien-17α,21-diol-11,20-dione 21-acetate, then into the free compound and finally into its 21-trimethylacetate. Among other 21-esters there was also prepared the 21-benzoates of these compounds.

Example V

To a solution of 1 g. of 6α-fluoro-16α-methyl-cortisone acetate in 20 cc. of dioxane there were added 2 cc. of the trimethyl ester of orthoformic acid and 60 mg. of p-toluenesulfonic acid monohydrate. The mixture was stirred at room temperature for 45 minutes, 2 cc. of pyridine were added, and the mixture poured into ice water. The product was then extracted with methylene chloride, the organic extract washed to neutral, dried over anhydrous sodium sulfate and evaporated to dryness. Crystallization from acetone-pentane gave 6-fluoro-16α-methyl-3-methoxy-$\Delta^{3,5}$-pregnadiene-17α,21-diol-11,20-dione-21-acetate.

By the same method, 6α-chloro-9α-fluoro-16β-methyl-$\Delta^4$-pregnene-17α,21-diol-3,11,20-trione described in our copending application Serial No. 824,200 and 16α-methyl-6α,9α-dichloro-cortisone acetate described in our copending application Serial No. 825,665, were converted respectively into 6-chloro-9α-fluoro-16β-methyl-3-methoxy-$\Delta^{3,5}$-pregnadiene-17α,21-diol-11,20-dione and 6,9α-dichloro-16α-methyl-3-methoxy-$\Delta^{3,5}$-pregnadiene-17α,21-diol-11,20-dione 21-acetate.

Example VI

In accordance with the method of Example I, 2.5 g. of 6α-fluoro-16α-methyl-hydrocortisone 11-trifluoroacetate was treated with ethyl orthoformate in dioxane solution and in the presence of p-toluenesulfonic acid, thus producing 6-fluoro-16α-methyl-$\Delta^{3,5}$-pregnadiene-11β,17α,21-triol-20-one 11-trifluoroacetate 21-acetate, which in turn was saponified with potassium hydroxide, to give 6-fluoro- 16α-methyl-3-ethoxy-Δ³,⁵-pregnadiene - 11β,17α,21-triol-20-one.

Esterification of the latter compound with caproic anhydride in pyridine solution gave the 21-caproate of 6-fluoro-16α-methyl-3-ethoxy-Δ³,⁵-pregnadiene - 11β,17α,21-triol-20-one.

*Example VII*

Example II was repeated, but using 6α,9α-difluoro-16α-methyl-hydrocortisone 21-acetate and the corresponding 16β-methyl isomer. There were thus obtained 6,9α-difluoro-16α-methyl-3-ethoxy-Δ³,⁵-pregnadiene - 11β,17α,21-triol-20-one-21-acetate; 6,9α - difluoro-16β-methyl-3-ethoxy-Δ³,⁵-pregnadiene - 11β,17α,21-triol-20-one-21-acetate, the corresponding free compounds and the corresponding propionates.

*Example VIII*

By following the methods described in Examples I, III and V, the compounds listed below under I were converted into the corresponding alkyl-enol-ethers (II).

| I—Starting Compound | Reagent | II—Final Compound |
| --- | --- | --- |
| 6α - fluoro - 16α - methyl-cortisone acetate. | isopropyl orthoformate. | 6 - fluoro - 16α - methyl-3 - isopropoxy - Δ³,⁵ - pregnadiene - 17α, 21 - diol - 11, 20 - dione 21-acetate. |
| 6α, 9α - difluoro - 16α-methyl-hydrocortisone-21-acetate. | ___do___ | 6, 9α - difluoro - 16α - methyl-3-isopropoxy-Δ³,⁵- pregnadiene - 11β, 17α,21 - triol- -20 - one 21-acetate. |
| 6α - chloro - 9α - fluoro - 16α - methyl - hydrocortisone 21 - acetate | ethyl orthoformate. | 6-chloro-9α-fluoro-16α methyl - 3 - ethoxy - Δ³,⁵. pregnadiene - 11β, 17α, 21 - triol - 20 - one 21-acetate. |
| 6α, 9α - dichloro - 16β-methyl - hydrocrotisone 21-acetate. | trimethyl ester of orthoformic acid. | 6, 9α - dichloro - 16β - methyl - 3 - methoxy - Δ³,⁵- pregnadiene - 11β, 17α, 21 - triol - 20 - one 21-acetate. |
| 6α - chloro - 16β - methyl - cortisone 21-acetate. | ethyl orthoformate. | 6α-chloro-16β-methyl-3 - ethoxy - Δ³,⁵- pregnadiene - 17α, 21 - diol - 11,20-dione 21-acetate. |

*Example IX*

In several other experiments the enol-ethers were formed by using triesters of orthoformic acid different from the ones mentioned in the previous examples and as specified in the introduction of the present application, to produce the corresponding ether groups, i.e. there was prepared the following 3-ethers of the compounds of the previous examples, butoxy, isopropoxy, hydroxyethoxy, acetoxyethoxy, phenoxy, benzyloxy, p-methoxyphenoxy, β-chloropropoxy and cyclopentylpropoxy.

The present application is a continuation in part of our copending application Serial No. 817,745, filed June 3, 1959.

We claim:
1. A compound of the following formula:

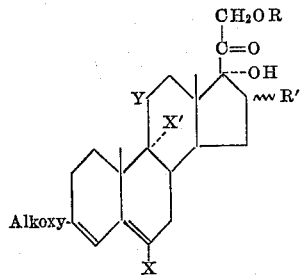

wherein alkoxy represents a hydrocarbon ether group of up to 12 carbon atoms, Y is selected from the group consisting of =O, —OH and —O—CO—CF₃, X is selected from the group consisting of fluoro, chloro and bromo, X' is selected from the group consisting of hydrogen, fluoro and chloro, R is selected from the group consisting of hydrogen and a hydrocarbon carboxylic acyl group of up to 12 carbon atoms and R' is selected from the group consisting of hydrogen, α-methyl and β-methyl.

2. The 3-enol-hydrocarbon-ethers of up to 12 carbon atoms of 6-fluoro-hydrocortisone.

3. The 3-enol-hydrocarbon-ethers of 16α-methyl-6-fluoro-hydrocortisone.

4. The 3-enol-hydrocarbon ethers of 16β-methyl-6-fluoro-hydrocortisone.

5. The 3-enol-hydrocarbon ethers of up to 12 carbon atoms of 6,9α-difluoro-hydrocortisone.

6. The 3-enol-hydrocarbon ethers of up to 12 carbon atoms of 6-chloro-9α-fluoro-hydrocortisone.

7. The 3-enol-hydrocarbon ethers of 6-fluoro-cortisone.

8. The 3-enol-hydrocarbon ethers of 6-chloro-cortisone.

9. The 3-enol-ethers of 6-chloro-9α-fluoro-cortisone.

10. The 21-hydrocarbon carboxylic acid esters of up to 12 carbon atoms of the 3-enol hydrocarbon ethers of up to 12 carbon atoms of 6-fluoro-hydrocortisone.

11. The 21-hydrocarbon carboxylic acid esters of up to 12 carbon atoms of the 3-enol-hydrocarbon ethers of up to 12 carbon atoms of 6-chloro-hydrocortisone.

12. The 21-hydrocarbon carboxylic acid esters of up to 12 carbon atoms of the 3-enol-hydrocarbon ethers of up to 12 carbon atoms of 6,9α-difluoro-hydrocortisone.

13. The 21-hydrocarbon carboxylic acid esters of up to 12 carbon atoms of the 3-enol-hydrocarbon ethers of up to 12 carbon atoms of 6-chloro-9α-fluoro-hydrocortisone.

14. The 21-hydrocarbon carboxylic acid esters of up to 12 carbon atoms of the 3-enol-hydrocarbon ethers of up to 12 carbon atoms of 6-fluoro-cortisone.

15. The 21-hydrocarbon carboxylic acid esters of up to 12 carbon atoms of the 3-enol-hydrocarbon ethers of up to 12 carbon atoms of 6-chloro-cortisone.

16. The 21-hydrocarbon carboxylic acid esters of up to 12 carbon atoms of the 3-enol-hydrocarbon ethers of up to 12 carbon atoms of 6,9α-difluoro-cortisone.

17. The 21-hydrocarbon carboxylic acid esters of up to 12 carbon atoms of 6-chloro-9α-fluoro-cortisone.

18. The 3-enol-hydrocarbon-ethers of 6,9α-difluoro-16α-methyl-hydrocortisone.

19. The 3-enol-hydrocarbon-ethers of 6α-chloro-16β-methyl-cortisone.

20. The 21-hydrocarbon carboxylic acid esters of up to 12 carbon atoms of the 3-enol-hydrocarbon ethers of up to 12 carbon atoms of 6α,9α-dichloro-16β-methyl-hydrocortisone.

References Cited in the file of this patent
UNITED STATES PATENTS

| 2,363,338 | Koster | Nov. 21, 1944 |
| 2,847,429 | Ercoli et al. | Aug. 12, 1958 |